DEAN & HIGHAM.
Car Wheel.
No. 6,019.
Patented Jan. 9, 1849.
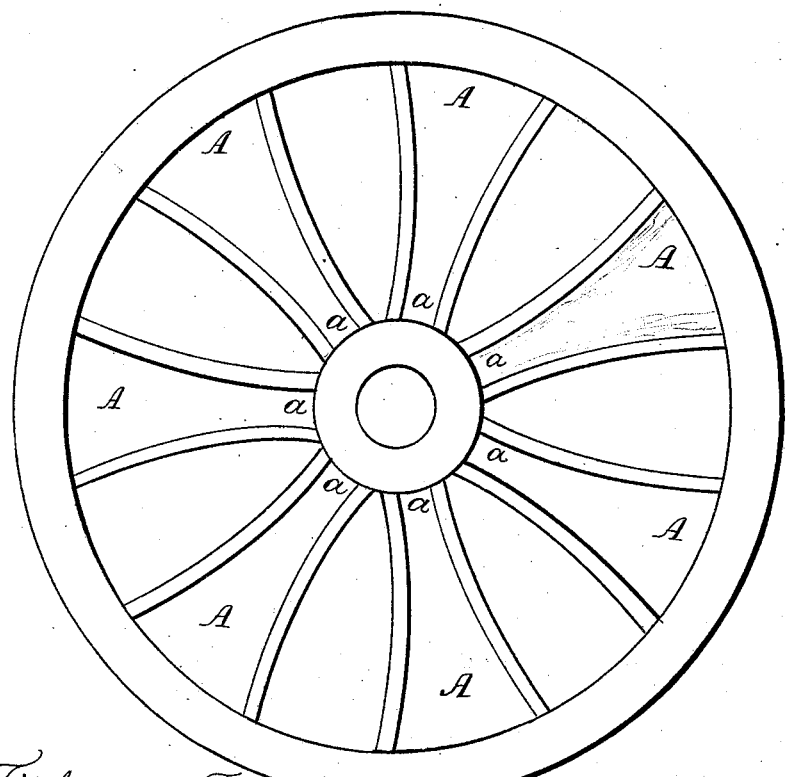

UNITED STATES PATENT OFFICE.

LINUS DEAN AND A. HIGHAM, OF UTICA, NEW YORK.

CAST-IRON CAR-WHEEL.

Specification of Letters Patent No. 6,019, dated January 9, 1849.

*To all whom it may concern:*

Be it known that we, LINUS DEAN and ABRAM HIGHAM, of the city of Utica, in the county of Oneida and State of New York, have invented a new and useful Improvement in Railroad-Car Wheels; and we do hereby declare that the following is a full, clear, and exact description of the construction and operation of the same, reference being had to the annexed drawings, making a part of this specification, in which—

Figure 1 represents a front or face view of the wheel; Fig. 2 a section thereof; Fig. 3 a section of the spoke where it joins the hub, and Fig. 4 a section of the same where it joins the rim of the wheel.

The improvement here described is in the form and construction of the spokes of the wheel, to which is given a complex curved form, both for the strength of the wheel and to allow a slight contraction in the process of cooling when cast, without breaking the spoke, or other part of the wheel, although the hub is cast whole, it being necessary and usual to cast the hub in sections to be held together by wrought iron bands when the spokes are cast of the usual straight form.

In this wheel the spoke consists of a curved plate of about the same thickness from end to end, doubled or partly folded together longitudinally, the edges approaching each other nearer at the end adjoining the hub, than at the end adjoining the rim of the wheel, as is denoted by the sections shown in Figs. 3 and 4 of the drawings.

Fig. 1 represents the face of the wheel, presenting the open or concave sides of the spokes, of which the ends A, A, A, &c., unite to the wheel rim in a form represented by the section shown in Fig. 4, and the ends a, a, a, &c., unite to the hub in a form represented by the section shown in Fig. 3. The ends A, A, A, &c., of the spokes (Fig. 1) thus spreading upon the interior surface of the rim, cover a large portion of the same, and serve to strengthen and sustain the wheel, while the irregular form of the spokes allows a slight contraction and expansion of the wheel, saving it from the breakage to which other wheels are liable. Besides the curve in this plate occasioned by its greater expansion at the outer end of the spoke, as at A, there is a further curve in the back of the spoke as seen at C, C, (Fig. 2), allowing a slight springing or contraction of the metal in a direction perpendicular to the hub. This wheel is cast whole, without any partitions in the hub, as before stated, and excepting the peculiarity in the construction of the spokes herein described, is constructed and put into use like the wheels now used on railroads, the outer surface of the rim being chilled in casting, as other wheels are.

What we claim as our invention and desire to secure by Letters Patent is—

The peculiar construction of the spoke of the wheel here described, the same being formed of a folded plate, doubling to nearly parallel lines at the hub, and expanding toward the rim, uniting to it in nearly a semicircular form, thus covering and sustaining the rim, while the complex curvature of the spoke, the same being curved in a vertical as well as a lateral direction, allows an expansion and contraction of the metal, favorable to the durability of the wheel, and permits it to be cast solid with an entire hub without cracking, the whole being constructed and arranged substantially as above set forth and described.

LINUS DEAN.
A. HIGHAM.

Witnesses:
WM. BAKER,
A. S. POND.